United States Patent Office 3,706,097
Patented Dec. 12, 1972

3,706,097
APPARATUS FOR INDICATING AND RECORDING THE SPEED OF MOTOR VEHICLES AND THE DISTANCE TRAVELED THEREWITH
Alfons Bauer, Bad Reichenhall, Germany, (% Dipl.-Ing. A. Berglein, 49 Widenmayerstr., 8 Munich 22, Germany)
Filed May 23, 1969, Ser. No. 827,425
Claims priority, application Austria, May 30, 1968, A 5,181/68
Int. Cl. G01d 9/00
U.S. Cl. 346—18                                    10 Claims

ABSTRACT OF THE DISCLOSURE

An apparatus for indicating and recording the speed of a motor vehicle and the distance traveled by the motor vehicle comprising a casing defining an open compartment and a writing lever apparatus connected to said casing. The writing lever apparatus is adapted to indicate and record vehicle speed and distance traveled. A clockwork drive connected to the casing is used for a record strip advancement. A removable housing is mounted in the casing compartment and comprises a roller cartridge mounted to the housing, the roller cartridge being adapted to hold a record strip and defining an outlet slot for the record strip end. A transporting cylinder and a wind-up spool are rotatably mounted to the housing in series connection, the transporting cylinder being in rotatable co-operation with the clockwork drive and the wind-up spool. A pulling out apparatus for the record strip end is in cooperation with the transporting cylinder and is adapted to automatically pull the record strip end forward during insertion of the housing into the casing. A catching apparatus for the record strip end cooperates with the wind-up spool and is automatically adapted to connect the record strip end with the wind-up spool after a certain advance movement of the record strip.

The invention generally relates to apparatus for indicating and recording the speed and distance traveled of motor vehicles and more particularly to apparatus comprising gear controlled writing levers for indicating and recording the vehicle speed and the distance, a clockwork-like drive for recording strip advance and an open casing compartment for a removable housing at the front side. The housing includes a record strip roller a transporting cylinder and a winding up spool in series connection, the transporting cylinder being in rotating cooperation with the record strip advance drive as well as with the winding up spool by gear means.

In practice it has been evident that the recording of the travel speed and the travel distance upon a record strip is superior to all other recording methods in precision and clearness. However, the problem with the use of prior record strip apparatus was that it was difficult to insert the record strip, as only personnel who were highly skilled could operate the mechanisms. Nervous fingers or cold hands made the insertion of the record strip a problem.

One object of the invention is to avoid these disadvantages by creating an apparatus for indicating and recording which makes insertion and change of the record strip possible without any difficulty.

According to the invention this problem is solved by an apparatus, in which the record strip roller is positioned in an operating condition in a roller cartridge. The roller cartridge is constructed with a delivery slot for the forward end of the record strip which is directed to the transporting cylinder. The transporting cylinder is positioned in a stationary position but is easily removable in a compartment of the housing. A pulling out device is provided for the foremost end of the record strip disposed in the delivery slot, which during the insertion of the housing in the casing compartment over the transporting cylinder in the writing zone automatically pulls out the record strip. A catch device is associated with the winding up spool which after a predetermined length advancement brings the forward end of the record strip automatically in rigid connection with the winding up spool.

In the present invention all manipulations and disturbances previously necessary during insertion of a new record strip roller in the block and during the fixing of the record strip end into the record strip advancement device are avoided.

In an additional embodiment of the invention a housing is provided between the roller cartridge and the transporting cylinder. The housing has a ledge-like pressure abutment surface in the rear of the writing zone. Above the pressure abutment surface, a type crown driven by the clockwork-like drive of the record strip advancement is positioned having radially to its rotation axle upon plate springs disposed types. Each of the types represents one hour from 1 to 24, whereas above the plate spring a striking lever automatically controlled by the clockwork-like drive for the time point of the types is positioned in printing position above the record strip with its print cheek end before attaining the printing position, and automatically receives ink from an ink applying device. On the record strip the time is printed or may be stamped by stamp.

Before a motor vehicle is driven after it has been parked for a long time, it is necessary to bring the clock of the indicating device into conformity with the actual clocktime. This correction of the pointer position of the clock is accomplished in the invention by means of a regulating wheel which is mounted on the shaft of the winding up spool and which engages the gear toothed wheel of the recording strip advancement device and the control wheel of the catch device in rotation. The pointers of the clock are adjustable over the gears of the record strip advancement device and of the clockwork, when the housing is completely inserted into the casing compartment. Thereby the gears of the advancement device and of the printing device are coupled in rotating movement over a friction coupling, by which it is relatively adjustable to each other by the regulating wheel.

In the invention it is possible to indicate the vehicle speed and the clock time, the distance run by figures, and to record upon a record strip, vehicle speed, the travel run and the time in the shape of adjacent passing curves respective zig-zag lines. In addition the time curves are assisted by figures designating the hours by printing or stamping so that each time space of a passed drive is distinctly represented and is easy to be read. The record strip preferably has four adjacent record paths, of which the paths $a$ and $e$ are for the recording of the travel distance and vehicle speed, the path $b$ is for the recording of the travel time, whereas adjacent to the recording path $b$, a path for the clocktime is provided which is printed or stamped.

Other features and advantages of the invention will be apparent from the following description of the embodiments of the invention as shown in the accompanying drawings.

All the gear indicating elements of the indicating device can be conventional construction to record the vehicle speed and the travel distance in the shape of curve-shaped lines and indicated figures by means of the employment of a record strip 54, which is advanced at a predetermined speed by an advancement drive, allied with a clockwork drive. The record strip in the form of a strip roller of paper or foil-like material is covered with a layer which is able to be superscribed, is inserted in the recording device and is wound up by a winding up spool after recording.

Figure 2:
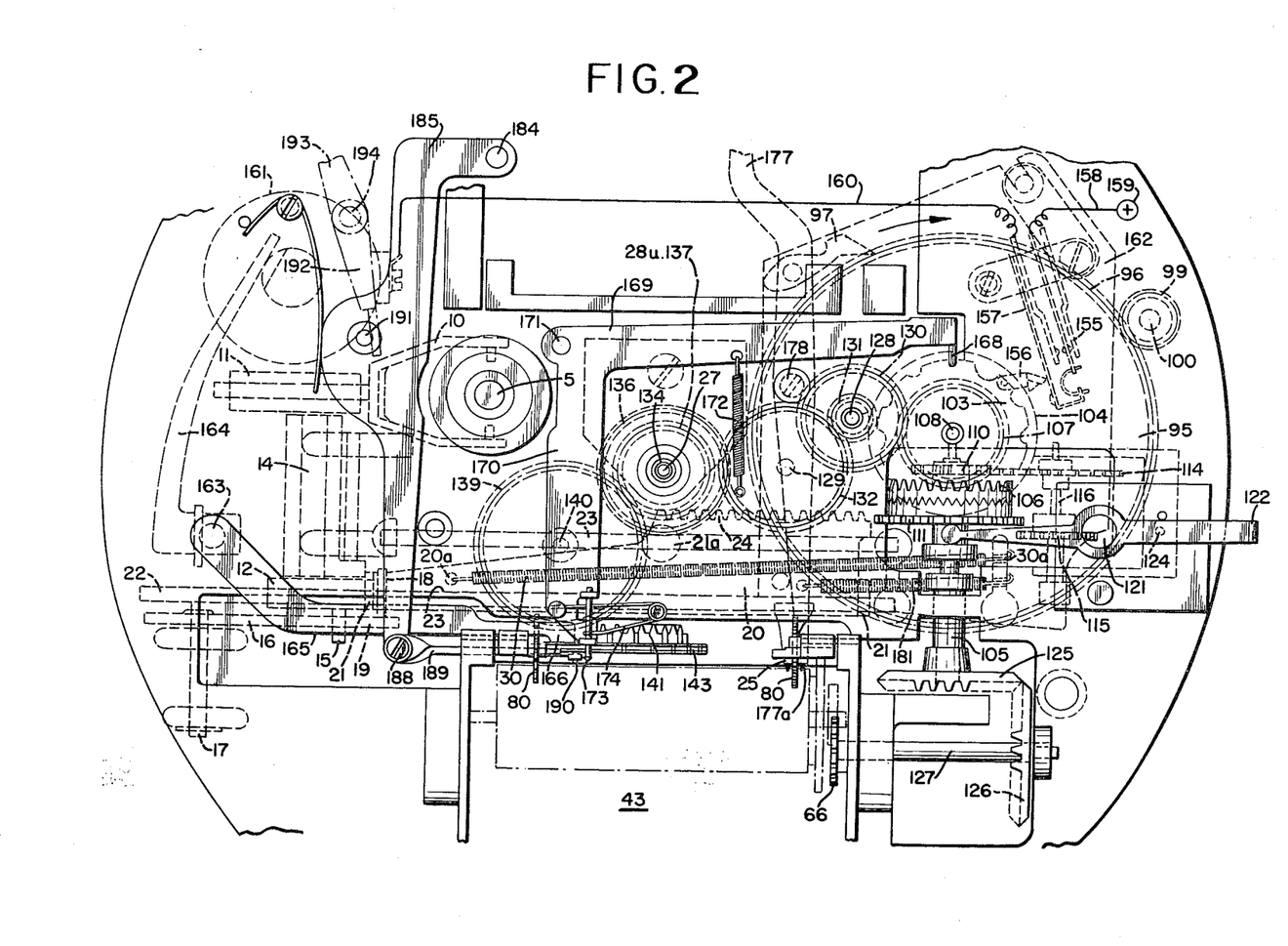
FIG. 2 shows the front plate with the essential gear parts in front view and in enlarged scale.
Figures 5, 9, 11:
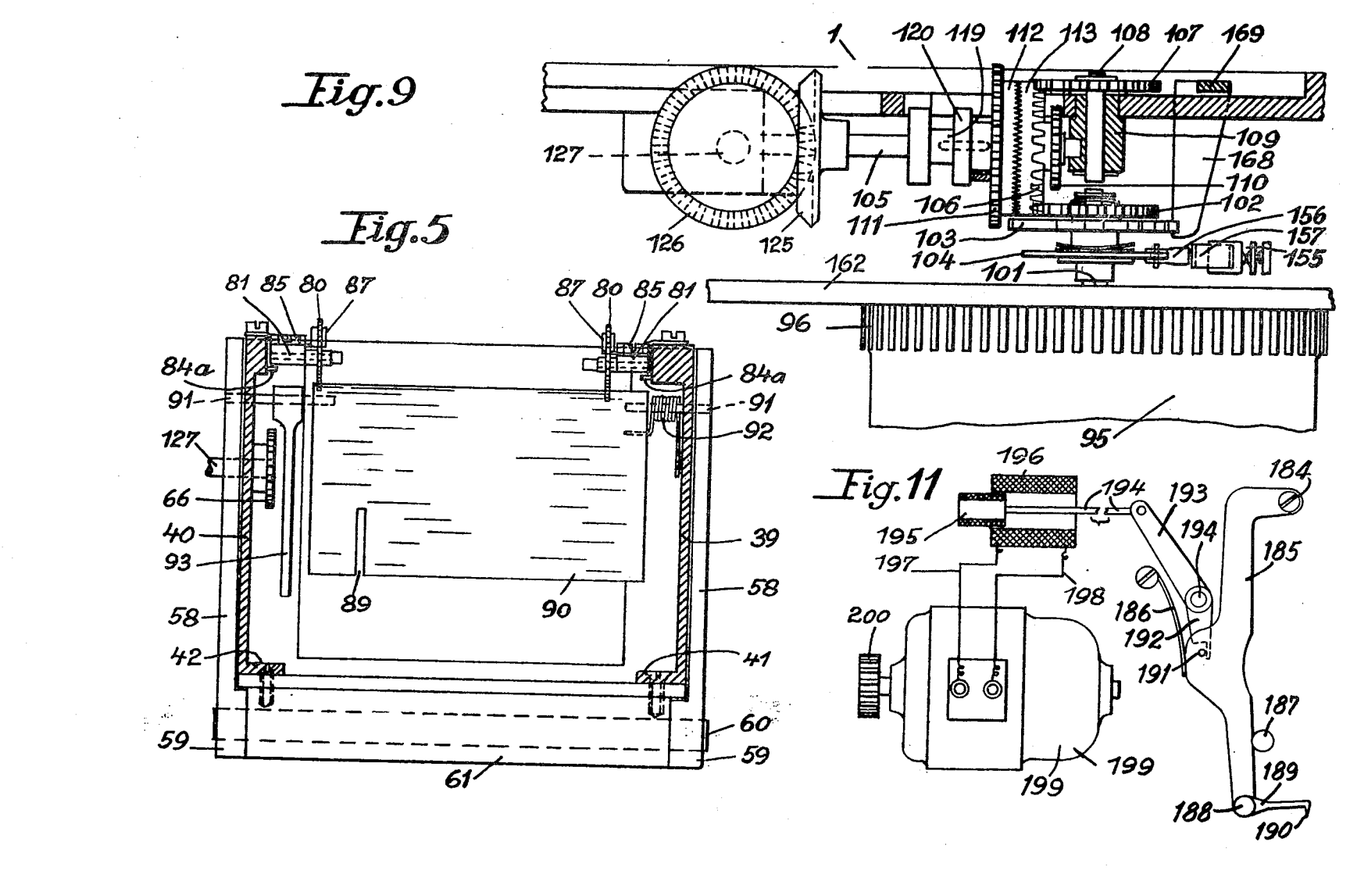
FIG. 5 shows an enlarged cross-sectional view of the casing compartment taken along line V—V of FIG. 3.
FIG. 9 shows an enlarged view of a part of the clockwork-like drive mechanism including a change gear.
FIG. 11 shows a diagrammatic representation of the apparatus for recording the engine r.p.m.

This device for recording of the vehicle speed, the distance run, the travel time and also the engine r.p.m. of a travel course is disposed in a casing compartment in the lower casing part of the indicating device (FIG. 2), which is laterally limited by a rectangular recess of the front plate 1 and by two lateral walls 39 and 40 projecting in the casing space. These lateral walls 39, 40 terminate a distance a from the rear plate 2 and are provided with opposite guide ledges 41, 42 projecting the inside at the same level. These two lateral walls 39, 40 project somewhat out from the recess of the plate 1 and limit essentially a casing compartment 43 containing the parts of the recording device (FIGS. 2 and 5). In casing compartment 43 a housing 44 (FIGS. 3, 4 and 6) can slide on the guide ledges 41, 42 of the side walls 39, 40, and is fixed between these lateral walls 39, 40.

The housing 44 includes two lateral walls 45, 46 which are joined to each other to a unit by two transverse walls arranged in suitable distance from each other Before the transverse wall 50 a transporting cylinder 51 is pivotally positioned with its axle studs in bearings of the lateral walls 45, 46 of the housing 44. Between the roller cartridge 47 and the transporting cylinder 51 a ledge-like pressure abutment bearing or surface 52 is provided which is integrally connected with the lateral wall 50 or carried by it and surrounds an angle part piece. The pressure abutment surface 52 extends nearly to the vertical line of the transporting cylinder 51 in relation to the writing zone (line 53) of the different writing levers recording the vehicle speed, the travel distance, the time and the number of motor revolutions during a drive. Behind the transporting cylinder 51 in the direction of advancement of the record strip 54 a rigid slide surface 55 is disposed which terminates before the winding up spool 56. The latter is positioned with its pivots in bearing slots 57 of that part of the lateral walls 45, 46 of the housing which projects somewhat out of the lateral walls 39, 40 of the casing compartment 43, when the housing is completely shifted into the casing compartment 43. The bearing slots 57 form an acute angle with the horizontal lower edge of the lateral walls 45, 46 to allow for the easy removal of the full winding up spool 56 out of the housing 44. The axle studs of the winding up spool 56 are held in the bearing slots 57 by springs. The part of the housing 44 projecting at the front out of the casing compartment 43 is closed by a cap 58 (FIGS. 3 and 5), which is made of glass-like transparent material or forms a magnifying lens near the record strip 54. The cap 58 pivots about an axle 60 in a vertical plane beneath the block guide ledges 41, 42 by means of two bearing eyes 59 (FIG. 5) which are laterally disposed to a broad bearing 61 which carries the axle 60 traversing the eyes 59. The cap 58 may be mounted at the plate 1 or, as shown in FIG. 5, at the guide ledges 41, 42 of the respective compartment walls 39, 40.

Figure 3:
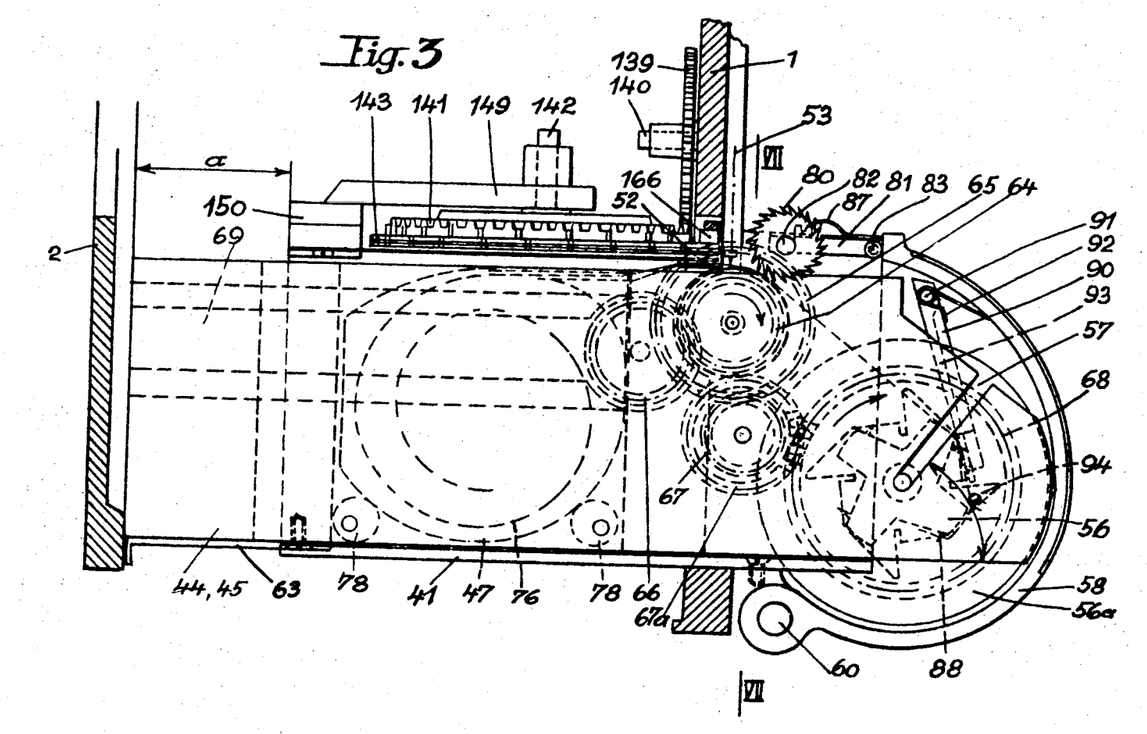
FIG. 3 shows a longitudinal section of the casing compartment and the block of the recording device.

The cap 58 may be also attached at a plate disposed at the underside of the block 44 and mounted at the transverse wall 50, so that it may be removed out of the indicating device together with the block 44. This cap 58 surrounds in its closed position a part of the compartment walls 39, 40 rather tightly and may be secured at the latter or the casing wall (not shown) against undesired opening. In the inserted position of the housing 44 in the casing compartment 43 the rearward end edges of the lateral walls 45, 46 abut against the rearward plate 2 (FIG. 3). For limiting the removal movement of the housing 44 a small plate 63 is mounted at the underside of the transverse wall 49 and abuts against the rear side of the frontplate 1, so that when the housing 44 is removed out of the casing compartment 43 a predetermined distance a new roller cartridge may be inserted in the housing compartment 48. The housing 44 may include a subdivided wall 49 shown by dotted line 49a in FIG. 6. The parts of the wall 49 are disposed contiguous to each other in longitudinal direction of the housing 44 and are connected with each other by a horizontal hinge axle 49b. The lower wall part allows the clamping down of the freely projecting part of the housing 44, so that in some cases the change of the winding up spool 56 and the insertion of a new record strip roller cartridge 47 is made easier.

Figures 6, 7, 8:
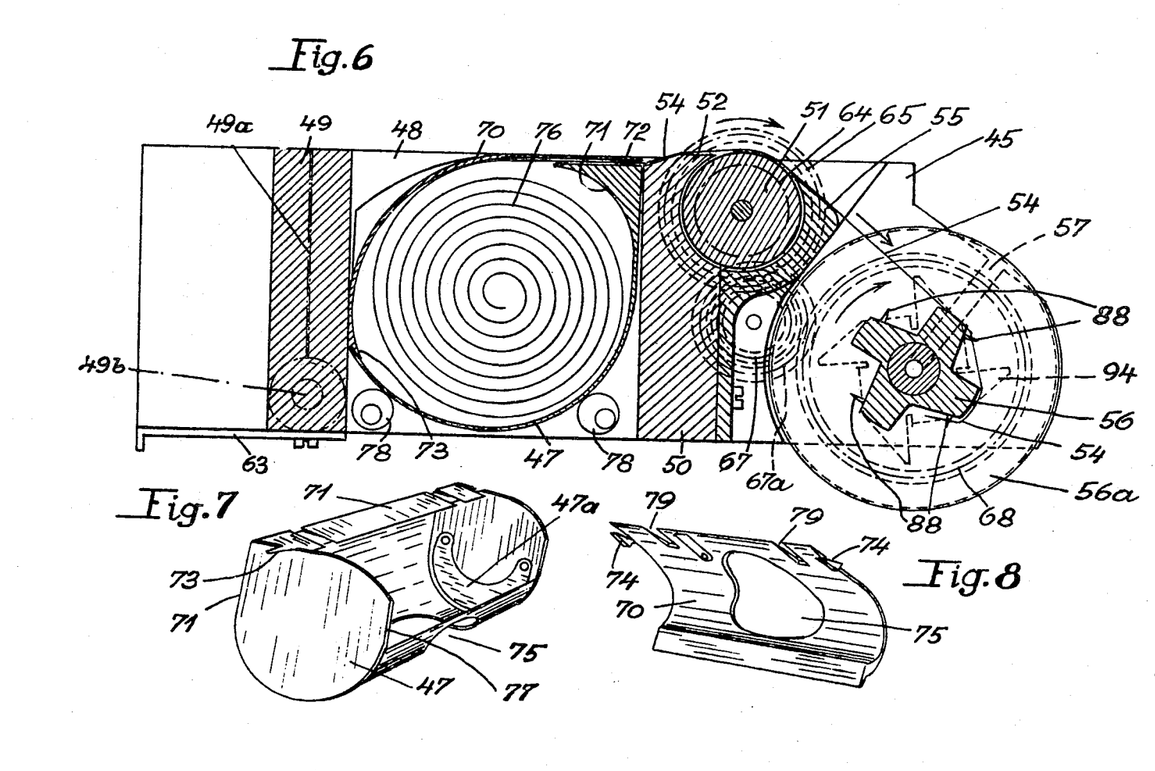
FIG. 6 shows an enlarged longitudinal section of the housing with a roller cartridge.
FIGS. 7 and 8 show a perspective view of the trough cartridge parts.

As shown in FIG. 8, th transporting cylinder 51 and the winding up spool 56 are rotated from the clockwork-like drive at a predetermined speed in the direction of the arrow for advancement of the record strip 54. For this purpose the transporting cylinder 51 is provided with two gears 64, 65 having different diameters attached on its axle studs. The gear 64 having a smaller diameter, engages a toothed wheel of the clockwork-like drive, which is later described, and which is positioned in the compartment wall 40 and freely projects into the inner compartment space. The gear 65 having a larger diameter, transfers its rotating motion to a gear 68 of the winding up spool 56 through gears 67 and 67a attached to a common shaft. The winding up spool 56 is in driving rotating connection with the toothed wheel 68 by a friction coupling (not shown) which allows for the difference between the record strip advancement of the record strip 54 and the increase of the winding up diameter. The lateral wall 45 of the housing 44 containing the gears 64, 65 in a recess, and is provided with a longitudinal groove 69 which is larger than the diameter and the thickness of the toothed wheel 66 and terminates rearwardly freely open. The groove 69 allows the engagement of the gear 66 with the gear 64 during insertion of the housing 44 in the casing compartment 43. The abutment of rearward lateral wall edges of the housing 44 against the inner surface of the rear plate 2 serves and secures exact teeth engagement of gears 64, 66.

Figures 4, 12:
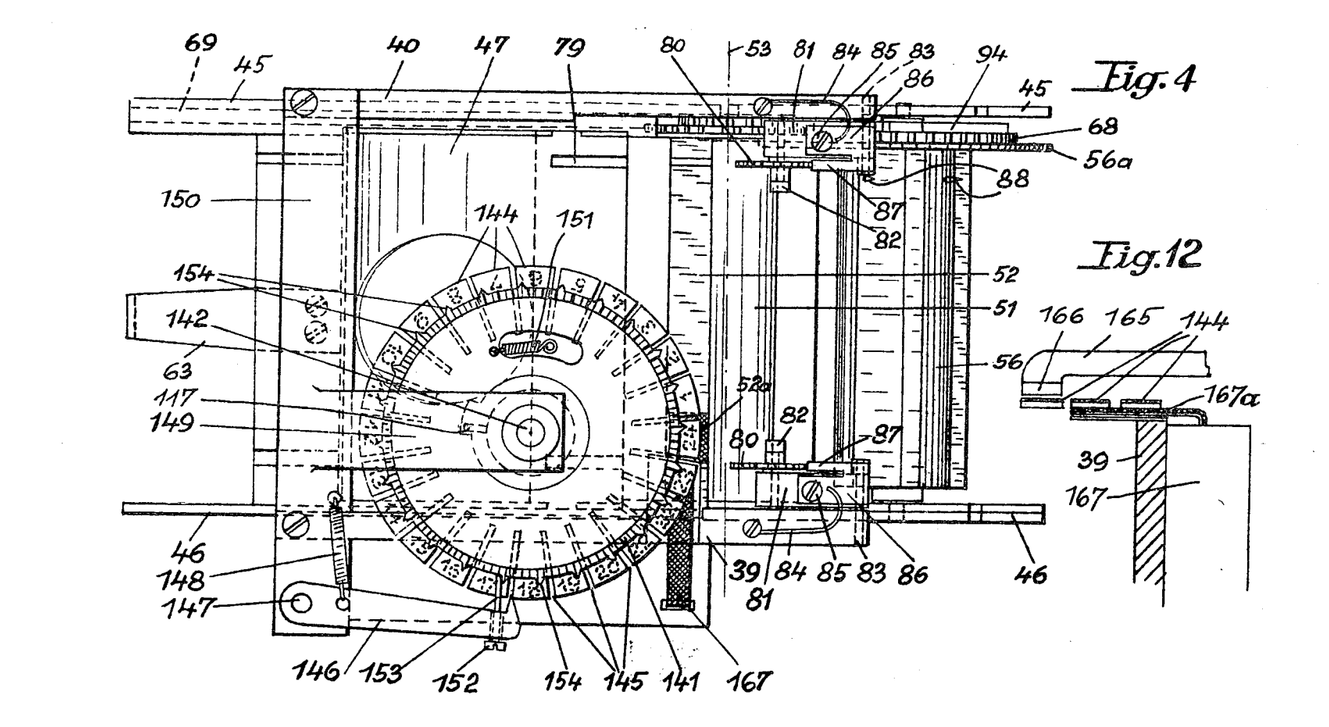
FIG. 4 shows a base view of the casing compartment and the block of the recording device.
FIG. 12 shows a detail of the ink applying device for the print means.

The roller cartridge 47 as shown in FIGS. 7 and 8 is inserted in the housing 44 and includes a trough-like container which may be closed by a cover 70. This container 47 is provided at the side directed to the pressure abutment surface 52 with an upwardly extending wall, having a guide abutment 71 for the record strip 54. The cover 70 extends also above the guide abutment 71 such a distance that it forms a guide slot for the record strip end of the record strip rollers 76 in a position ready for operation. The record strip roller 76 is yieldably held with friction in position by a plate spring 47a mounted at the cartridge wall and pressing axially against the record strip roller 76. The container 47 and the cover 70 are made of a suitable plastic and joined together by notches 73 and bending snap tongues 74 or the like. The trough-like container 47 and the cover 70 may be provided a recess 75 which makes visible the record strip 54 and the record strip roller 76. The roller cartridge 47 can be removed from the housing compartment 48 and adjusted to suit the slot 72 in adjusted position by the guide abutment 71. In addition, on its parallel side wall edges 77 fitted to the walls 45, 46 of the housing 44. The roller cartridge 47 is supported at its underside upon abutments 78 disposed in the housing compartment 48, which consists of eccentrics attached by axial screws. The roller cartridge cover 70 is provided with two parallel slots 79, through which pass catches 80 on the casing compartment walls 39, 40 (FIGS. 3 and 4). When the housing 44 is introduced into the casing compartment 43 the catches 80 automatically pull the record strip end 57 out of the slot 72. Each of the two catches 80 consists of a toothed wheel also actuating as a press roller for the transporting cylinder 51, which is pivoted with its axle at the free end of a lever arm 81 in the introducing direction of the housing 44. Each lever arm 81 is pivotally disposed in a vertical plane on a horizontal axle 83. The axles 83 of both lever arms 81 are disposed in line at the two lateral walls 39, 40 of the casing compartment 43 at a point which is situated in a corner limited by a front edge and a longitudinal edge of a lateral wall 39 or 40. Each of the two lever arms 81 is acted upon by a spring 84, which presses its toothed wheel 80 against the transport cylinder 51. An abutment wheel 84a holds the lever arm 81 ready for operation when the housing 44 is moved out of the casing compartment 43. As shown in FIG. 4, screw 85 attaches the flat spring 86 at the lever arm 81, which is provided with a flexible tongue actuating as link. The flexible tongue engages the toothing of the corresponding cog gear 80 serving as press roller, and allows the rotation of the latter by the transport cylinder 51 only in the direction of advance of the record strip 54. In an opposite direction these two toothed wheels are stopped by the tongues 87 and act then with hook-like teeth as a cog or catch for the record strip 54 during the insertion of the housing 44 in the casing compartment 43. This operation occurs in such a manner, that the teeth of the cog toothed wheels 80 by the resilient action of the spring 84, which presses upon the lever arm 81, fall into the slots 79 of the cartridge cover 70 during the introduction of the housing 44 into the casing compartment 43, thereby taking the front end of the record strip 54 and pulling it out of the cartridge slot 72. During the further introduction of the housing 44 into the casing compartment 43 the record strip end reaches the surface of the pressure abutment 52 and crosses the vertical line of the transport cylinder 51 (dotted line 53).

In this stage of the simultaneous introduction of the housing 44 into the casing compartment 43 and the advancement of the record strip 54, the housing 44 has attained its complete introduction depth and the gear 64 of the transport cylinder 51 engages the gear 66 of the advance device. As the record strip 54 has already crossed the writing zone 53 on the transporting cylinder 51, the recording of the vehicle speed, the travel distance and the time can begin.

For automatically taking the record strip 54 by the winding up spool 56 the following catch device is disposed in the cap 58 of the housing 44. The spool body 56 has a cross-shaped cross section, so that each profile leg forms a ledge, which corresponds in length with the spool length. From each of these ledges of the spool body 56 at least one needle is directed in the direction of rotation to pass through a slot 89 in the plate 90 and engage the record strip 54 during rotation of the winding up spool 56. This flap 90 preferably consists of a clear glass material and pivots about an horizontal axle 91 disposed near the upper longitudinal edge in bores of the lateral walls of the cap 58 and is pressed by a spring 92 against one of the ledges of the spool body 56 in an opposite direction to the needle points 88. Adjacent to the plate 90 and a lever arm 93 (FIG. 5) is attached, so that the plate 90 with assistance of its spring 92 may strike an elastic blow against the front end of the record strip 54, when the latter comes in the range of one of the needle points 88. The lever arm 93 is actuated by the control wheel 94, which is rigidly connected with the gear 68 of the winding up spool 56 and is provided with four teeth corresponding to the cross-shaped cross section of the winding up spool 56. This control wheel 94 swings during the rotation of the winding up spool 56 the lever arm 93, and thereby moves the plate 90 by means of the ascending back of one of its teeth to the cap wall, and releases the lever arm 93 just after the latter has passed one teeth point, so that the lever arm 93 by the force of the spring 92 with elastic force strikes against the record strip 54, thereby pressing the record strip 54 against a ledge of the body with the needle point 88. By the pressing of the plate or flap 90 the needle point 88 penetrates the record strip 54 and makes a rigid connection between the record strip 54 and the winding up spool 56. Obviously this automatic flap motion remains during the whole of the rotation of the winding up spool 56 and therefore ensures a tight winding up of the record strip 54.

The clockwork drive for the advance of the record strip 54 includes a drum-like spring casing 95, having a toothed crown 96, which is held against the torque exerted the spring upon the spring casing 95, by a link 97. The clockwork is disposed in a casing 98. According to the strength of the spring it has an endurance of movement, for example of 24 hours, several days or a whole week. The clockwork-like drive is wound up, for instance by means of a toothed wheel 99 engaging the teeth crown 96 of the spring casing 95 and by means of a key (not shown) connected to its axle 100. The clockwork-drive 95, 96 acts exactly in time and drives by a shaft 101 centrally projecting out of the spring casing 95, a gear 102 (FIG. 9) of a control disc 103 for the recording of the time elapsing by a zig-zag line. In addition a control disc 104 is driven for actuation of a printing device by means of a friction coupling, that is to say, the work elements 102 to 104 are disposed upon the shaft 101 of the clockwork spring with a friction securing its drive, but allowing its rotation independent from the latter for the purpose of adjustment of the pointer.

The gear 102 of the spring shaft 101 drives a crown wheel 106 freely rotatably disposed upon a gear shaft 105 as shown in FIG. 11. The crown wheel 106 transfers its pivotal movement to a gear 107 which is also freely rotatably disposed upon an axle stud 108 and in line with the clock shaft 101 set in a bearing projecting from the front plate 1 into the inner workspace. The gear shaft 105 is parallel to the plate 1 and carries a small gear 110 and a larger gear 111. The gear 110 is rigidly connected with the crown wheel 106. The toothed wheel 111 can slide along the gear shaft 105, but is coupled with it for rotation. The gear 111 is provided with a crown having a toothed front surface forming one part of a coupling 112 which engages an oppositely shaped coupling crown 113 of the crown wheel 106, when the gear 111 is coupled with the crown wheel 106.

The gears 110 and 111 form together with the gears 114, 115, FIG. 2, a change gear, of which only the gear 111 as a change gear can slide along the gear shaft 105, whereas the gears 114, 115 are rigidly attached to a common shaft 116, which freely rotates a bearing frame 118 attached to the plate . The change gear 111 is provided with a sleeve 119 sliding along the gear shaft 105, but coupled with the latter in rotating direction. The sleeve 119 has a circular flange 120, and an annular groove in it in which the one end of a two-armed adjusting lever 122 fits. The adjusting lever is pivoted in a stationary stud 121, whereas the second arm 123 of this lever 122 projects from the rim of the plate 1 and is adjustable by hand in two positions, which are held by spring-loaded studs, pins or the like. During rotation of the coupling 112, 113 a direct connection is made between the crown wheel 106 and the gear 111 coupled with the gear shaft 105 for rotating movement, which in this position engages no other gear. The gear 111 transfers the rotating movement from the crown wheel 106 to the gear shaft 105 and so via bevel wheels 125, 126 to the shaft 127, at the other end of which the gear (FIG. 3) in the casing compartment 43 drives via the gear 64 the transport cylinder 51. Thereby a larger advance of the record strip 54 is realized. The recording of the vehicle speed, the travel distance and the time occurs within a certain time unit, for instance for an hour, upon a larger length section of the record strip 54. In the other case the change gear 111 is released from the crown wheel 106, but engages the small pinion gear 115 of shaft 116, so that rotation of the crown wheel 106 by means of the gears 110, 114, 115 is transferred to the change gear 111 in a small scale. The gear 111 turns the gear shaft 105 and therewith the bevel wheels 125, 126, the shaft 127 and the gear 66 in the casing compartment 43 in the same time space, more slowly, whereby the advancement of the record strip 54 is reduced. Thereby it is possible to reduce the strip advance when the vehicle is stopped or traveling slowly, for instance 10 km./h. to about 1 cm./h. by the gears 107, 114, 115 and 111 in this manner record strip length is saved. At a vehicle speed of more than 10 km./h. the advance of the record strip is so adjusted, that a clear recording of the measure values covered during a drive is secured.

With the gear 107 the rotating movement is transferred over the gears 130, 131, 132 pivoted on the axle studs 128, 129 of the front plate 1 to a gear 136 attached to the hollow pointer shaft 134 of the minute pointer 135. The pointer works also includes a gear 137 which is rigidly connected with the hour pointer 138 by a sleeve. For the purpose of the time adjustment of the clockwork respective the pointers 135, 138 the winding up spool 56 is provided with an adjusting wheel 56a having a milled or roughened circumferential rim. During insertion of the housing 44, coupled gears 106 and 111 are between the adjusting wheel 56a and the gear 68 are rigidly connected with it and gears 130, 131, 132 of the linking means. A rotation connection occurs with the minute wheel 136, which by rotation of the adjusting wheel 56a adjusts the pointer 135 to the exact time.

The gear 137 associated with the hour pointer 138 engages another gear 139, which is freely pivotally disposed upon the axle stud 110, and engages a toothed crown 141 forming with the gear 139 a right angle. In the printing work the type disc is provided with 24 type and rotates in 14 hours about the axle stud 142 (FIGS. 3 and 4). The pointer includes a plate spring disc 143 and a disc of 1 mm. thick rubber or a suitable plastic, and carries the type. Both discs are provided with radial indentations or slots 145 directed to the axle center and spaced in equal angle spaces, by which 24 resilient tongues 144 are designed, each of which carries one of the types 1 to 24. The plate spring disc 143 and the type disc are held by a link 146 engaging one of the radial indentations 145, which is pivotally disposed on a stationary stud 147, and is held in its engaging position by a spring 148. The toothed crown 141 and the type disc 143 are freely pivotally disposed on an axle stud 142, which is rigidly attached to a bearing arm 149. The bearing arm projects from a bridge 150 connecting the both lateral walls 39, 40 of the casing compartment 43, as far in the direction of the front plate 1 so that the pitch of the type crown passes the center of a flap 52a, which is countersunk in the pressure abutment surface 52 of the housing 44. Thus each of the types is positioned at the allied elastic flexible tongue 114 of the plate spring disc 143 above and opposite the flap 52a of the pressure abutment surface 52. For printing the type indicating the current time or hour at the beginning of the time space, a spring 151 operating as elastic coupling member and attached with one end to the teeth crown 141 and with the other end to the plate spring disc 143, is tensioned in the direction of rotation. The toothed crown 141 is provided at its circumference surface for each spring tongue 144 of the plate spring disc 143 with a switch tooth 154. Into the path of the movement of these switch teeth 154 there projects a lifting pin 153 in the direction of rotation of the plate spring disc up stream from the link projection, which is adjustably attached to the link 146 by a screw 152 in the direction of the longitudinal of the pin with respect to the circumference of the teeth crown 141. For instance after completion of a time (e.g. 1 hour) the lifting pin is slightly raised out of one indentation 145 by one of the switch teeth 154 for releasing of the link nose out of the indentation 145, thereby causing a following movement of the plate spring disc 143 for an angle limited by the stud 117 of the plate spring disc and a circular recess in the toothed wheel hub for one plate spring tongue 144. Since the spring 148 acts as elastic coupling, it suddenly advances the plate spring disc 143 for one indentation in the instant of release of the link 146 out of the indentation 145. The type, a given time of the time section, for instance one hour, is disposed opposite the flap 52a of the pressure abutment surface 52, whereas the teeth crown 141 advances in rotation from minute to minute.

The time point of the printing of a type upon the record strip 54 is determined by the control disc 104 rigidly attached upon the clockwork shaft 101 by means of an electric switch 155. The control disc 104 is provided with a link projecting from its circumference, in the circular movement path of which extends the release arm 157 of the instant switch 155, which is actuated during one revolution of the control disc 104. This electric instant switch is attached at a plate 162 of the clockwork and connected by a line 158 with a current source by a line 160 electrically connected with a solenoid 161. The solenoid 161 is attached at the plate 1 and provides for the short time actuation of a two-armed pivotal lever 164, 165 about the axle 163 disposed at the plate 1. The one arm 164 of this lever 164, 165 is situated beneath the plate 1, and extends with its end in the field of the magnetic force of the solenoid 161. The other lever arm 165 is disposed at the outer surface of the plate 1 and extends to the plate spring tongue 144 which is ready for print and is disposed opposite the flap 52a attached to the pressure abutment surface 52. The end of this lever arm 165 a small pressure cheek 166, which is moved against the spring tongue 144 in printing position in the instant of the short time activation of the solenoid 161 by means of the two-armed lever 164, 165, whereby the type recording the time for a short time is pressed down against the record strip 54 and the pressure abutment surface 52. In all the types the printing of the type recording the figure of the recent hour is made exactly and clearly. The inking means 167 (FIGS. 4 and 12) is outside that compartment side wall above which the plate spring is situated, so that the inking of the types occurs at a short distance before the pressure point where printing takes place. The inking means 167 is provided with a flap carried by a steel spring tongue 167a (FIG. 12) of very absorbent material, which dips into the ink container 167 and reaches with its free end in tangential direction to the type being ready for printing. Thus the ink applying flap 167a always freshly inks that type from beneath by the assisting action of the steel spring tongue supporting it, just before the printing point. Naturally an ink strip may be used which in a known manner is stepwise advanced. Instead of type, letters executing a stamping action may be used.

Adjacent to the time indicated in figures by the printing it is also reasonable to record the time by a curve upon the record strip 54. This is executed in such a manner that the control disc 103 (FIGS. 2 and 9) is provided at its circumference with notches of different depth for the whole hour, for each half an hour and also for five minutes distance. On the control disc circumference rests the scanning finger 168 of a two-armed lever 169, 170 under the action of a spring 172. This lever 189, 170 pivots about an axle stud 171 attached at the plate 1 and carries at the free end of its arm 170 a writing pin 173, which slides lengthwise in bearings and is slightly pressed by a pair of hairpin springs 174 against the surface of the record strip 54. This writing pin 173 records upon the record strip 54 in a path 6 a deep indentation for the full hour, a smaller indentation for half the hour and a very small indentation for the five minutes distance in the shape of a time curve 133. As this line shaped time recording 133 with the time recording or printing in hours is combined, each time section appears clearly on the record strip 54.

Also the traveled distance length is recorded in the shape of a zig-zag line 176 by means of the writing point 177a of a writing lever 177, which pivots about an axle stud 178 of the plate 1 and abuts with its second arm against a heart-shaped cam 179 having a nose 180 and is under the action of a spring 181. The cam 179 is rotated by the worm gear 182, 183, connected with the shaft 37 of the switching gear 38 of the path counting work, and moves the lever 177 in such a manner that this lever for instance for each path length of 500 meters traveled distance records a zig-zag line upon the record strip.

For the recording of the engine r.p.m. the following arrangement is used as is shown in FIG. 11:

At the front plate 1 of the indicating device a one-armed lever 185 is disposed on an axle stud 184, which under the action of a spring 186 abuts against an abutment 187 and is thereby limited in one turning direction. The free end of the lever is connected with a governor, and carries at one end a writing point 190 by which the lever abutment is held in the zero position, indicating that the engine is stopped. The one-armed lever 185 carries at a distance from its axle stud 184 a cog pin 191, which reaches through an opening of the plate 1 in the range of movement of one lever arm 192 of a two-armed lever, which pivots on the axle stud 194 of the plate 1 the second arm 193. The second arm 193 is connected by a governor 194a with the movable solenoid 195 of the solenoid 196. This solenoid 196 is electrically connected with a generator 199 which is provided with a gear 200 which is positively connected with a gear of the motor shaft of the vehicle motor or the shaft of an aggregate driven by this vehicle motor, as for instance a dynamo. The generator driven by the engine according to the r.p.m. supplies electric energy to the solenoid, which moves its core axially and moves by means of the lever 192, 193 and the cog pin 191 the one-armed lever 185 out of its base position in FIG. 2 for recording a curve in the path of the record strip 54 by means of the writing point 190. The r.p.m. curve is shown in FIG. 1 at 201.

Figure 1:
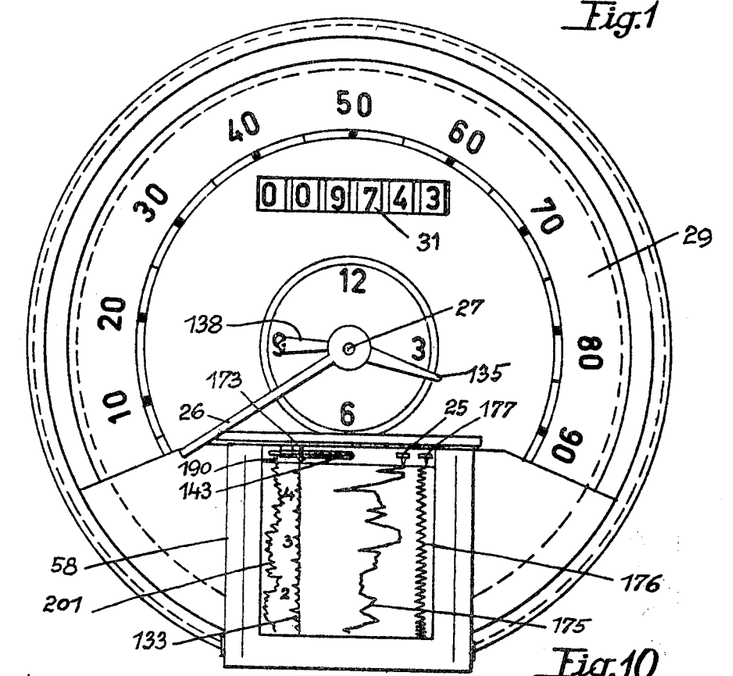
FIG. 1 shows the apparatus in front view.
Figure 10:
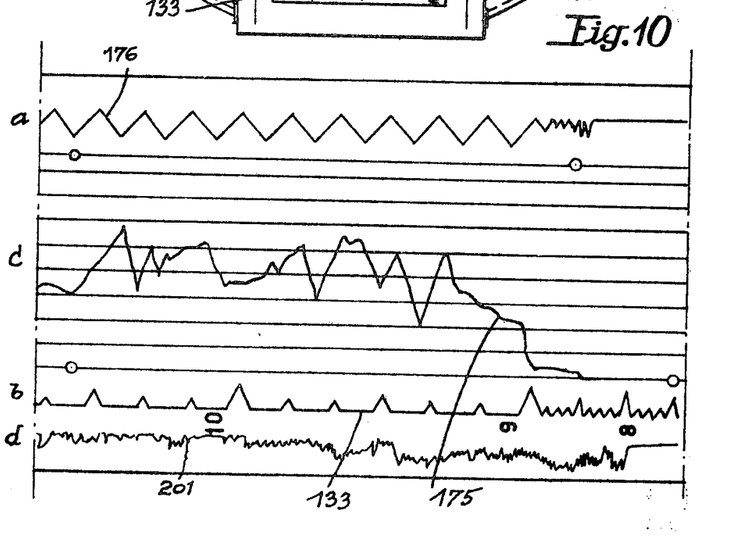
FIG. 10 shows an enlarged longitudinal part of the record strip with the five recording paths in enlarged scale.

From the FIGS. 1 and 10 the recorded measure values of the vehicle speed, the traveled distance, the travel time and the motor load in the shape of curve lines 175, 176, 133 and 201 in the paths e, a, b, d are visible, and by printing of the travel hours adjacent the time line the possibilities of control are made much easier. The record strip 54 gives an exact picture about all phases of the vehicle drive and indicates clearly within what time space the advance was adjusted on a small advancement value or speed.

While the preferred embodiment of the invention has been disclosed, it is understood that the invention is not limited to such an embodiment since it may be otherwise embodied in the scope of the appended claims.

I claim:

1. An apparatus for indicating and recording the speed of a motor vehicle and the distance traveled by the motor vehicle comprising a casing defining an open compartment, writing lever means connected to said casing, said writing lever means being adapted to indicate and record vehicle speed and distance traveled, a clockwork drive for a record strip forward advancement connected to said casing, a removable housing mounted in said casing compartment, said removable housing comprising a roller cartridge mounted to said housing, said roller cartridge being adapted to hold a record strip and defining an outlet slot for the record strip end, a transporting cylinder and a wind-up spool rotatably mounted to said housing in series connection with each other and with said roller cartridge, said transporting cylinder being in rotatable cooperation with said clockwork drive and said wind-up spool and positioned immediately adjacent to said slot, a pulling out means for the record strip end for automatically pulling the record strip end forward during insertion of the housing into the casing, and catching means for the record strip end cooperating with said wind-up spool and for automatically connecting the record strip end with the wind-up spool after a certain advance movement of the record strip.

2. An apparatus according to claim 1, wherein the roller cartridge comprises a trough-shaped container, a guide abutment for the record strip connected to said container, a removable cover connected to said container, said cover when connected to said container defining said outlet slot and lock means connecting said cover with the container.

3. An apparatus according to claim 2, wherein the housing comprises a plurality of lateral walls joined to each other by transverse walls to form a compartment, abutment means connected to the housing, and, wherein the trough-shaped container of the roller cartridge has wall edges parallel to the lateral walls of the compartment, said wall edges being adapted to shift the container in the housing until the container contacts said abutment means connected to said housing, said abutment means limiting the shifting movement of the container in a downward direction.

4. An apparatus according to claim 2, wherein said pulling out means include lever means mounted to said casing, ratchet wheels pivoted on the free ends of said lever means, springs mounted on the casing to press the ratchet wheels against the transporting cylinder, and links connected to said casing, said links engaging the ratchet wheels to provide for free rotation of the ratchet wheels only in the advance direction of the record strip, said ratchet wheels having hook-like teeth engaging the record strip end for advance of the strip over the transport cylinder.

5. An apparatus according to claim 1, wherein the catching means comprises a horizontal axle mounted to said casing, a flap pivotally disposed about the horizontal axle, said flap defining at least one slot, a spring mounted on said axle to press the flap against the wind-up spool, a control arm mounted on said axle, means to activate said control arm controlled by the rotation of said wind-up spool, the wind-up spool having a cross-shaped cross section profile and having at least one needle point projecting therefrom in the rotation direction and introduced during spool rotation into a slot of the flap, so that at the instant of release of the control arm by said activation means, the flap rebounds against the record strip end by the action of the spring to press the record strip against the wind-up spool.

6. An apparatus according to claim 1, wherein said wind-up spool is mounted on a shaft and is rotatably connected with gear means of the record strip advancement device and a control wheel of the catching means.

7. An apparatus according to claim 6, wherein the clockwork includes a pointer, a regulator is pivoted on the shaft of the wind-up spool, which is rotatably connected with the gear means of the record strip advancement device and the control wheel of the catching means, so that the pointer of the clockwork during complete insertion of the housing in the casing compartment is adjustable over the gear of the record strip advance device, and means to drive the gear means of the record strip advance device and the printing device with the clockwork drive and the clockwork spring, allowing the gear means to rotate relative to the clockwork drive.

8. An apparatus according to claim 5, wherein the catching means is positioned in an area encompassed by a transparent cap when said cap is in a closed position, said cap being pivotally connected to said casing at its lower edge about a horizontal axle.

9. An apparatus according to claim 3, wherein the rear transverse wall of the housing comprises two transverse sections, extending over the whole transverse width of the housing, each transverse section being connected with each other by a horizontal hinge axle at the lower ends, and the lateral walls of said housing are subdivided in the same vertical plane as the hinge axle, so that the housing in its removed position may be clamped downwards about the horizontal axle.

10. An apparatus according to claim 3, wherein a record strip roller is held in said roller cartridge container by a spring, said spring being mounted in one wall of said container to hold the record strip roller yieldably in its operating position in the container and said container and the cover are provided with at least one recess to allow observation of the record strip roller in the roller cartridge.

References Cited
UNITED STATES PATENTS

| | | | |
|---|---|---|---|
| 1,753,923 | 4/1930 | Felty | 346—145 |
| 2,341,118 | 2/1944 | Rodanet | 346—18 |
| 2,864,603 | 12/1958 | Bauer | 346—18 |
| 2,902,332 | 9/1959 | Bauer | 346—18 |

RICHARD B. WILKINSON, Primary Examiner

U.S. Cl. X.R.

346—145